Dec. 17, 1968  L. G. BACH ET AL  3,416,548

HIGH PRESSURE RELEASE VALVE

Filed Feb. 14, 1966

INVENTORS
LLOYD G. BACH
WILLIAM B. CLAXTON
BY
William N. Antonis
ATTORNEY

United States Patent Office 3,416,548
Patented Dec. 17, 1968

3,416,548
HIGH PRESSURE RELEASE VALVE
Lloyd G. Bach and William B. Claxton, Mishawaka, Ind., assignors to The Bendix Corporation, a corporation of Delaware
Filed Feb. 14, 1966, Ser. No. 527,226
1 Claim. (Cl. 137—68)

ABSTRACT OF THE DISCLOSURE

The following relates to an explosively actuated high pressure release valve wherein a closed end tube extending into a transverse bore is utilized as a metallic sealing partition member and is partially severed by a squib-actuated piston member. The tube has a notched weakened wall portion extending around the periphery thereof and a non-weakened indented portion on one side thereof at the end of the weakened wall portion which acts as a hinge for the severed tube.

---

An object of this invention is to provide a high pressure release valve which will discharge fluid under high pressure at a predetermined time or upon the occurrence of some predetermined condition.

Another object of this invention is to provide a high pressure release valve which will be actuated by an explosive charge.

A further object of this invention is to provide a new and improved high pressure release valve which provides complete separation between the high pressure port and the outlet port without the necessity for resilient seals.

A still further object of this invention is to provide an explosive operated high pressure release valve which is suitable for use in connection with the storage of a high pressure fluid for a lengthy period of time.

An important object of this invention is to provide an explosive operated high pressure release valve wherein the metallic sealing partition member between the high pressure port and outlet port, which is ruptured by the explosive charge, will not, upon its being ruptured, cause contamination of the high pressure fluids.

More specifically, it is an object of this invention to provide a high pressure release valve wherein a closed end tube extending into a transverse bore is utilized as the metallic sealing partition member, and a squib actuated piston member, which is located in the bore, is utilized to cause communication between the high pressure and outlet ports by partially severing the closed end of the tube without contaminating the high pressure fluid.

Another important object of this invention is to provide a high pressure release valve of the type described wherein the closed end tube has a notch around the periphery thereof for providing a weakened wall portion and a pre-dented portion on one side thereof at said notch, said pre-dented portion acting as a hinge about which the top of said tube bends after the tube is contacted by the squib actuated piston member.

A further object of this invention is to provide a high pressure release valve of the type described wherein the closed end tube is partially severed by placing it in tension rather than by shearing the end thereof.

Figure 1:
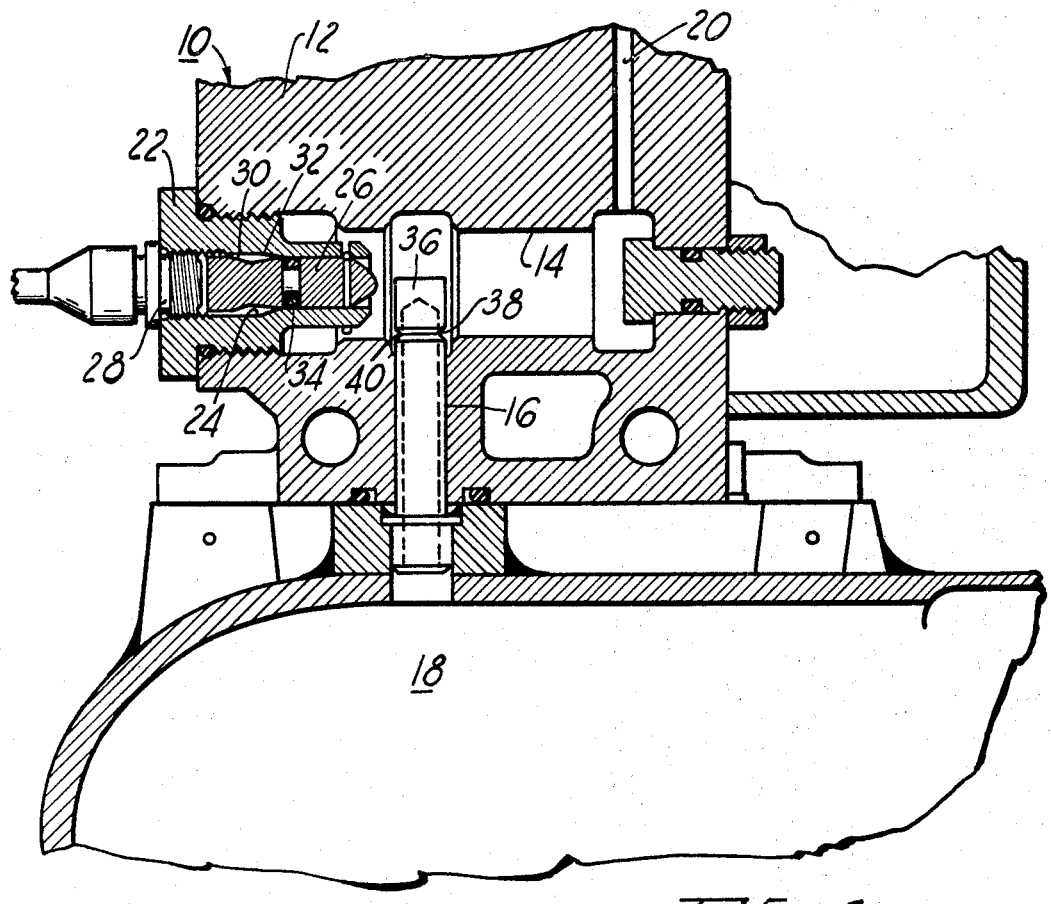
Figure 2:
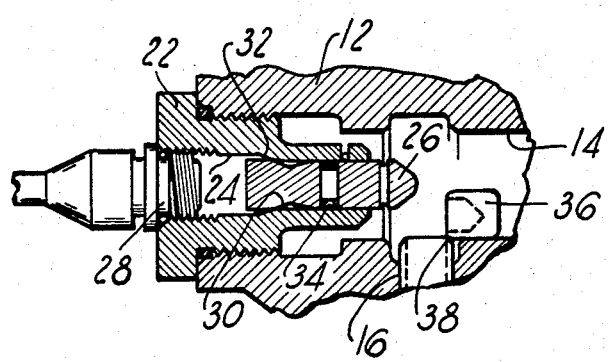

The above and other objects and features of the invention will become apparent from the following description taken in connection with the accompanying drawing which forms a part of this disclosure and in which:

FIGURE 1 is a sectional view of a portion of a fuel pressurization system for an aircraft which incorporates the invention; and FIGURE 2 is a sectional view of a portion of the high pressure valve shown in FIGURE 1, in which the valve is shown in its fully actuated condition.

Referring to FIGURE 1 of the drawing, it will be seen that the numeral 10 designates a high pressure release valve which at a predetermined time will release the flow of a gas (e.g. nitrogen) under high pressure to a regulator (not shown). The regulated gas is then applied to the fuel bladders to pressurize the fuel during flight. The high pressure release valve is comprised of a housing 12 having an axially extending bore 14, a storage tank port 16, which communicates with a storage tank 18, and an outlet port 20, which communicates with the regulator. A plug 22 having a bore 24, which communicates with and is in axial alignment with bore 14, is threaded into the housing 12. Located in the bore 24 is a movable piston 26 and a squib 28. Forward movement of the piston is limited by engagement of conical portion 30 of the piston with conical portion 32 of bore 24. An O-ring 34 prevents the explosive squib gases from escaping into bore 14 and contaminating the pressurized gas therein after the valve has been actuated.

A closed end tube 36, which in effect is a hollow closed end partition member, is located in tank port 16 and extends transversely into bore 14. The tube 36 is dented on one side 38 thereof by suitable means, such as a swaging tool. After predenting the tube, a V-notch 40, which extends around the periphery of the tube, is cut by suitable means, such as by a lathe. The V-notch provides a weakened wall portion which is capable of withstanding the internal pressure of the gas in tank 18 but incapable of withstanding predetermined external impacts.

Operation of the high pressure release valve will be as follows: At some predetermined desired moment the squib 28 is ignited by any suitable means, such as an electrical circuit, having the necessary leads and source of potential, which is closed in any manner known in the art, as by the operation of a switch or relay. The explosive gases resulting from the firing of the squib causes a rapid increase in pressure in bore 24 and produce a reaction force on the end of piston 26 which causes the piston to move suddenly and forcefully to the right into contact with the tube 36 at a point above the V-notch 40 and on the side opposite dent 38. This sudden impact places the tube in tension and causes partial severance of the tube at the V-notch by bending the tube about dent 38. Thus the dent 38 in effect acts as a hinge and prevents the top of the tube from being completely knocked off and thrown against the walls of bore 14 by the impact of the piston and by the high pressure fluid flowing from the tank port 16 to the outlet port. Such "bouncing" of the top of the tube against the bore walls has been found to cause contaminants to break loose from the walls or the tube top which are likely to foul up the regulator downstream thereof. Thus by providing a hinge through means of dent 38, this source of contamination is eliminated. Furthermore, by utilizing such hinge, it will be noted that the top of the tube is partially severed through means of tensile failure only, rather than shear failure. It has been found that shearing off the end of the tube creates a ragged slivery surface, even if the tube is notched, and that such shearing creates minute fragments which can damage the apparatus to which the high pressure fluid is directed. Accordingly, by providing a novel arrangement, wherein the top of the tube is partially severed by means of tensile failure and bending about dent 38 a relatively smooth contaminant free break results and secondary contaminants created by forceful contact of the tube top with the bore walls are eliminated.

Although this invention has been described in connection with a specific embodiment, those acquainted with this art will readily understand that the invention herein set forth is not necessarily limited and restricted to the precise and exact details presented and that various changes and modifications may be resorted to without departing from the spirit of the invention.

Accordingly, we do not desire to be limited to the specific details described herein, primarily for purposes of illustration, but instead desire protection falling within the scope of the appended claim.

Having thus described the various features of the invention, what we claim as new and desire to secure by Letters Patent is:

1. A pressure release valve comprising a housing having a bore therein, a tank port, and an outlet port, said ports communicating with said bore, a closed end tube extending transversely into said bore and interposed between said tank and outlet ports for preventing communication therebetween, said tube having a notched weakened wall portion extending around the periphery thereof and a non-weakened indented portion on one side thereof at the end of said weakened wall portion, said indented portion acting as a hinge, a movable piston member located in said bore for suddenly and forcefully contacting said partition member above said weakened wall portion so as to place same in tension and partially sever said tube at said weakened wall portion by bending the tube about the non-weakened indented portion, actuating means for impelling said piston member into sudden and forceful contact with said tube, and means located in said bore for limiting axial movement of said piston member.

References Cited

UNITED STATES PATENTS

| 1,951,897 | 3/1934 | Binckley | 220—89 |
| 3,079,047 | 2/1963 | Chiodini et al. | 222—5 XR |
| 3,202,162 | 8/1965 | Eckardt et al. | 137—68 |

WILLIAM F. O'DEA, *Primary Examiner.*

RICHARD GERARD, *Assistant Examiner.*

U.S. Cl. X.R.

220—89; 222—5